June 14, 1966 J. G. MARBAN 3,255,661
KALEIDOSCOPE DEVICE
Filed June 20, 1963 3 Sheets-Sheet 2
FIG. 4
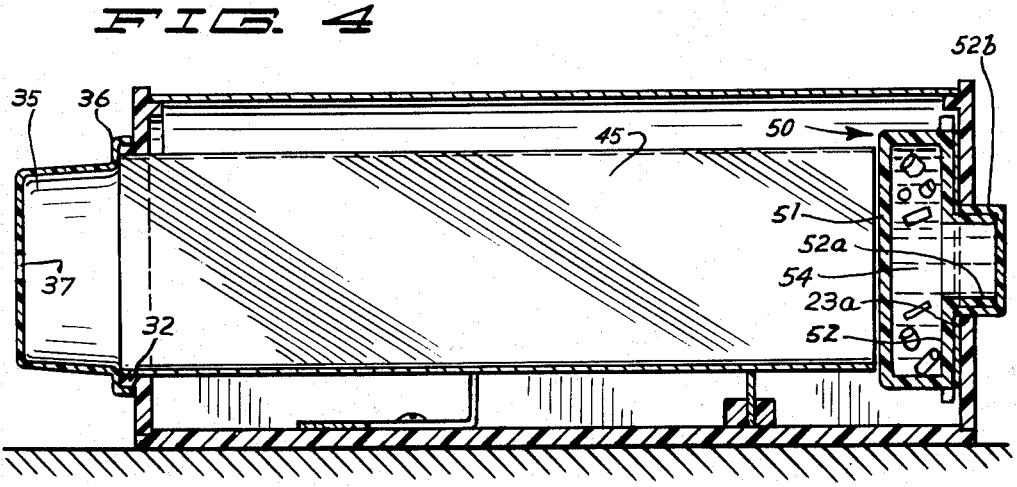
FIG. 5
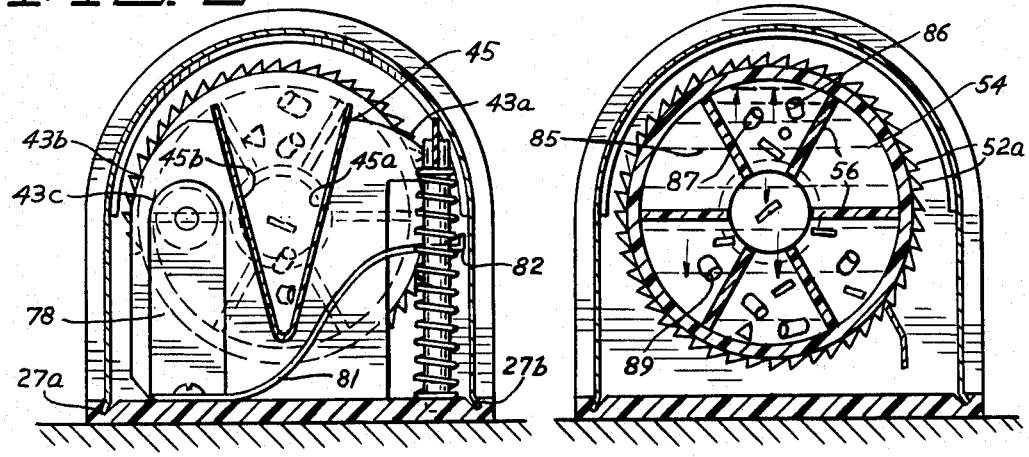
FIG. 6
FIG. 7
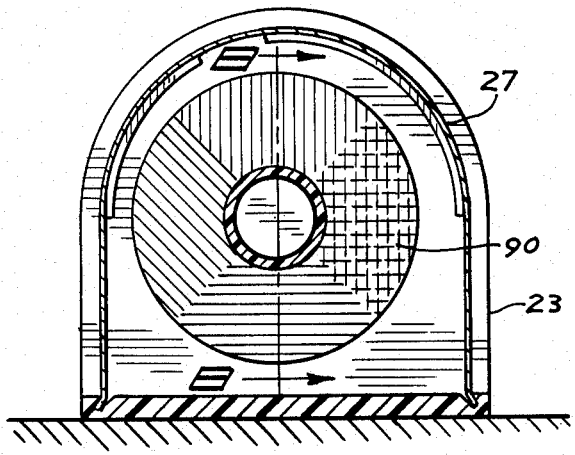
FIG. 8
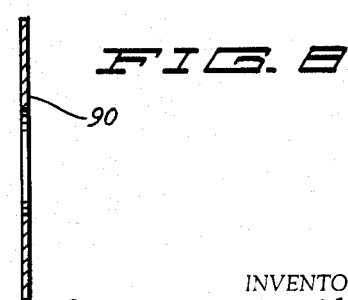
INVENTOR.
JULIAN GUTIERREZ MARBAN
BY
ATTORNEYS June 14, 1966 J. G. MARBAN 3,255,661
KALEIDOSCOPE DEVICE
Filed June 20, 1963 3 Sheets-Sheet 3
FIG. 9
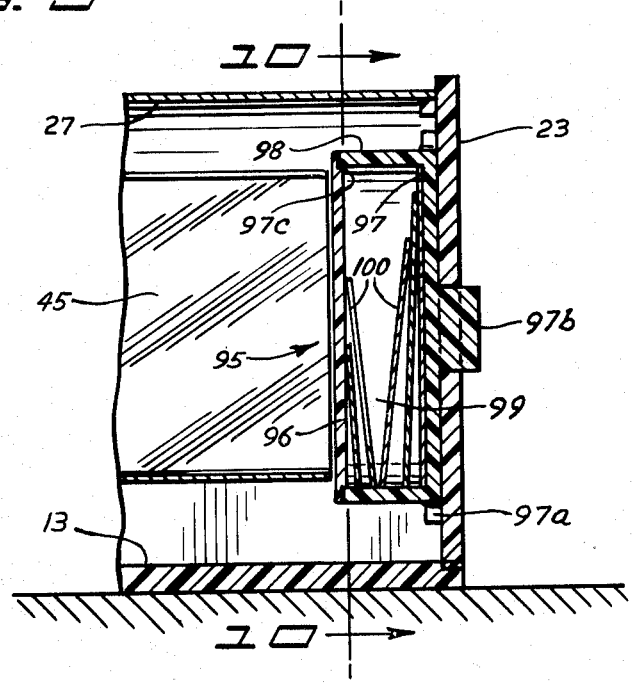
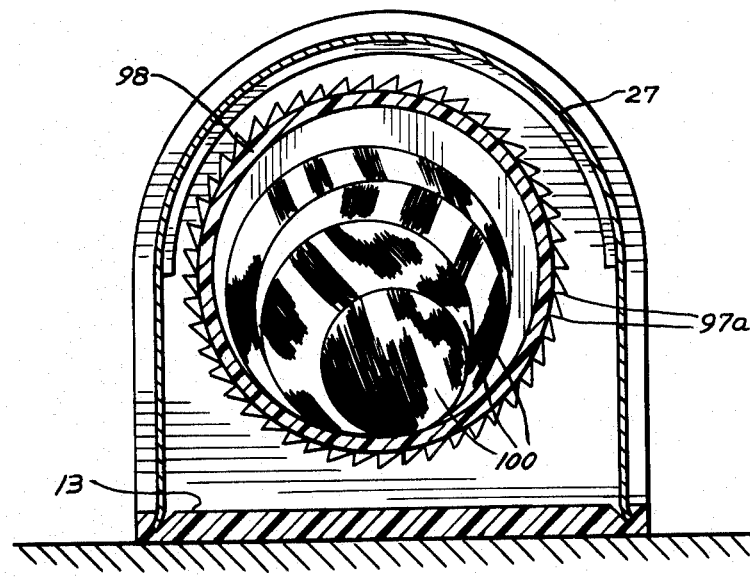
FIG. 10
INVENTOR.
JULIAN GUTIERREZ MARBAN
BY
Reif and Gregory
ATTORNEYS

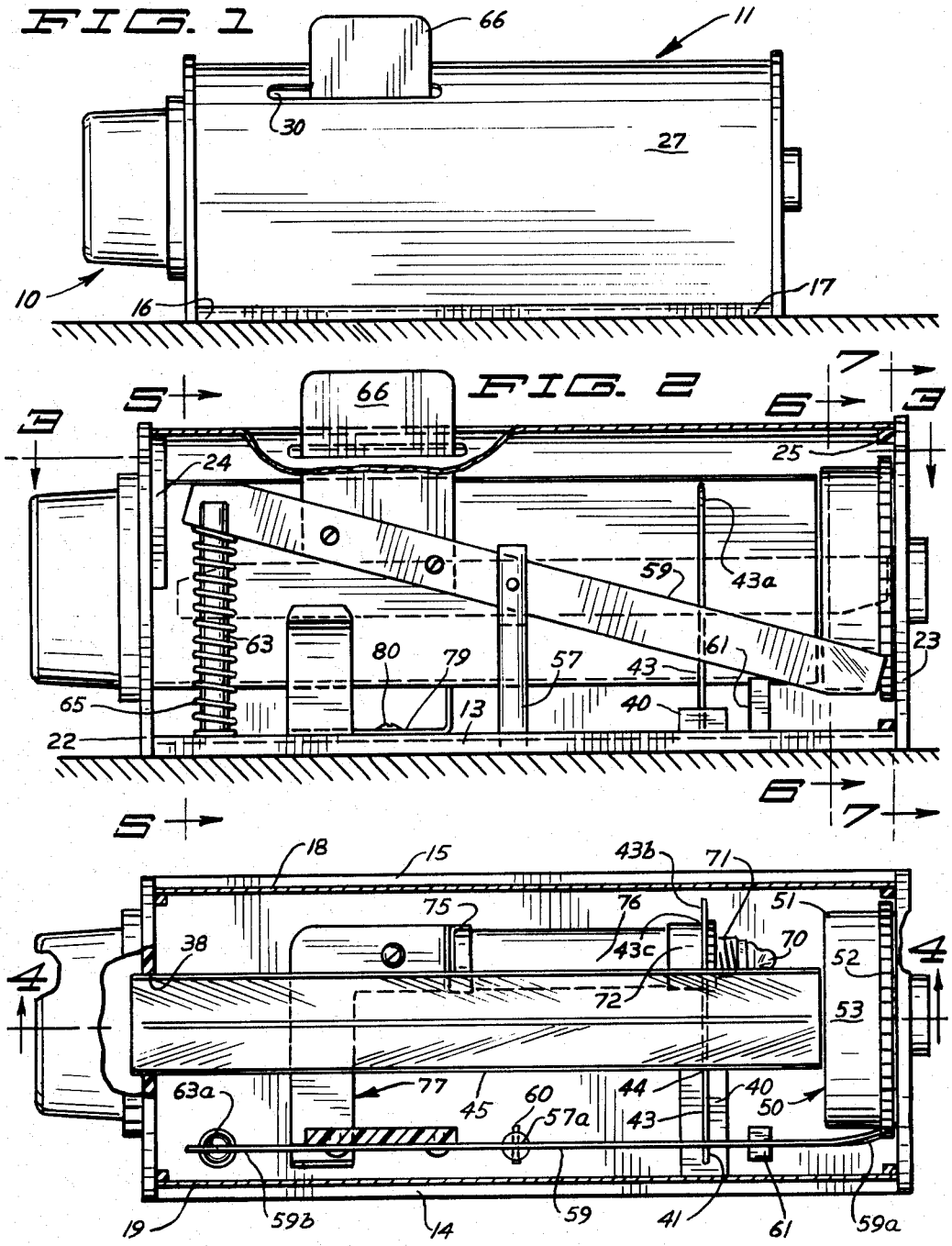

United States Patent Office 3,255,661
Patented June 14, 1966

3,255,661
KALEIDOSCOPE DEVICE
Julian Gutierrez Marban, 6233 Brookview Ave. S.,
Minneapolis, Minn.
Filed June 20, 1963, Ser. No. 289,193
5 Claims. (Cl. 88—15)

This invention relates to an improvement in a kaleidoscope device. The changing patterns viewed in known kaleidoscope devices are caused by hand rotation of the body portions of the kaleidoscopes containing the pattern-forming member. Further, a kaleidoscope generally must be held in the direction of a light source to illumine the pattern viewed.

It is desirable to have and an object of this invention to provide a kaleidoscope having means to cause changes in the patterns viewed without requiring rotation by hand of the kaleidoscope generally or of the pattern-forming member therein.

It is another object of this invention to provide a light source within the kaleidoscope structure to illumine the patterns formed therein.

It is a further object of this invention to provide an improvement in the complexity and variation of patterns capable of being formed in the pattern-forming apparatus.

It is a still further object of this invention to provide replaceable elements for a ready interchange of pattern-forming apparatus.

It is more specifically an object of this invention to provide a kaleidoscope having a completely enclosed light free housing member containing the pattern-forming apparatus therein with said housing member containing a lighting means and an actuating member both to change the pattern viewed and to energize said lighting means.

It is also an object of this invention to provide a kaleidoscope comprising a housing having a base portion and a removable cover portion, said base portion supporting a pattern-forming apparatus, a lighting means and an actuating member, said actuating member operating said pattern-forming apparatus and said lighting means.

In connection with the above object, it is also an object of this invention to provide interchangeable pattern-forming apparatus, each such piece of apparatus having an entirely different construction for forming said patterns.

These and other objects and advantages of the invention will be fully set forth in the following description made in connection with the accompanying drawings in which like reference characters refer to similar parts throughout the several views and in which:

FIG. 1 is a view of applicant's device in side elevation on a reduced scale;

FIG. 2 is a view in side elevation with a portion thereof shown in vertical section and portions thereof shown in dotted line;

FIG. 3 is a view in horizontal section taken on line 3—3 of FIG. 2 as indicated;

FIG. 4 is a view in vertical section taken on line 4—4 of FIG. 3 as indicated;

FIG. 5 is a view in vertical section on a somewhat enlarged scale taken on line 5—5 of FIG. 2 as indicated;

FIG. 6 is a view similar to FIG. 5 taken on line 6—6 of FIG. 2 as indicated;

FIG. 7 is a view in vertical section on a somewhat enlarged scale taken on line 7—7 of FIG. 2 as indicated;

FIG. 8 is a view in vertical section taken on line 8—8 of FIG. 7 as indicated;

FIG. 9 is a broken view in vertical section on an enlarged scale showing a modification as to a portion of applicant's device; and FIG. 10 is a view in vertical section taken on line 10—10 of FIG. 9 as indicated.

With reference to the drawings, the applicant's kaleidoscope device will be indicated generally by the character 10. It will be understood that applicant's device may be variously formed as to its specific construction to carry out the inventive concept embodied therein. In the embodiment of the invention here presented, applicant's device is shown comprising a housing member 11 substantially semi-cylindrical in general form having a flat bottom wall or base plate 13 rectangular in plan having side edge portions 14 and 15 and ends 16 and 17. Said base plate has formed therein along either side edge portion thereof oppositely inclined grooves 18 and 19.

Upstanding at either end of said base plate in parallel relation are substantially semi-circular end walls 22 and 23. Said end walls respectively have arcuate inwardly extending flange portions 24 and 25 forming ledge supports for a cover 27 of flexible sheet material being substantially rectangular in plan and being formed to have a cross sectional configuration to mate with the general form of said end walls in plan. The lower edge portions 27a and 27b at either side of said cover 27 are inclined outwardly to be received within said grooves 18 and 19 to removably secure said cover in position overlying said base plate. Said cover has a longitudinal slot 30 therein at an upper side portion thereof, as indicated in FIG. 1.

Extending forwardly of said end wall 22 substantially centrally thereof is an annular flange 32. Adapted to frictionally engage said annular flange and be supported thereby is a cup-shaped eyepiece 35 having an angled flange portion 36 to seat over said flange 32 and having a central aperture or viewing opening 37 in the closed end portion thereof.

Extending through said end wall 22 is a V-shaped opening 38 confined within the circumference of said annular flange 32.

Spaced inwardly of said end wall 23 and secured to said base plate 13 is a transversely disposed rectangular block 40 having a longitudinal vertical slot 41 therein. Upstanding from said block 40 and having its lower edge portion removably disposed in said slot 41 is a plate member 43 having a V-shaped opening 44 therein in alignment with said like opening in said end wall 22.

Disposed through said V-shaped openings 38 and 44 is a mirror member 45 formed of a sheet of reflective material having its sides angled to be V-shaped in cross section to correspond with said openings 38 and 44 and having adjacent reflective surfaces 45a and 45b. Said member 45 will extend substantially the full length of said base plate 13 and will also have a portion extending outwardly of said end wall 22 to be received within said cup-shaped eyepiece 35.

Mounted on said end wall 23 is a pattern-forming member 50 substantially cylindrical in form preferably made of a transparent sheet material, such as of plastic, having a rear wall 51 and spaced therefrom a front wall 52 with a peripheral cylindrical side wall 53 therebetween forming a chamber 54 therein. Said front wall has a peripheral notched or toothed flange portion 52a extending outwardly in the plane thereof to form a ratchet wheel of said front wall 52. Said member 50 will be further described hereinafter as to details thereof.

Upstanding centrally longitudinally of said base plate 13 adjacent the side edge portion 15 thereof is a post 57 having an open-ended vertical slot 57a therein in which is disposed a lever 59 pivotally held therein by a pin 60. Said lever is here shown to be of an elongated plate-like form having its forward end portion 59a angled inwardly somewhat, as indicated in FIG. 3, to engage the teeth of said ratchet wheel 52. Underlying said lever 59 adjacent its end portion 59a is an upstanding member 61 forming a stop. Spaced somewhat inwardly of said wall 22 and in alignment with said post 57 is a post 63 having a vertical open-ended slot 63a therein. Disposed in said slot is the rearward end portion 59b of said lever 59. A coil spring 65 is disposed over said post bearing against said base plate 13 with its lower end, and bearing against said lever portion 59b with its upper end to normally hold said lever portion 59b in a raised position.

Secured to said lever 59 at a point between said posts 57 and 63 and upstanding therefrom is an actuating member 66 forming a trigger or a plunger here shown to be plate-like in form positioned to extend upwardly through said cover slot 30.

Said plate member 43 in being disposed transversely of said base plate 13 has its end portion 43a adjacent said lever 59 cut out to accommodate said lever and to have a portion extending over said lever to be engaged thereby when said portion 59a of said lever is moved to its raised position. Said plate member 43 at its other end portion 43b adjacent the side edge portion 14 of the base plate 13 has an aperture 43c therein. Secured within said aperture and mounted on said plate member 43 is a light bulb 70 threaded into a sleeve-like socket 71 having a threaded portion extending through said aperture to be lockingly engaged by a collar 72. Spaced axially from said collar 72 is an end cap 75 supported in its raised position by a spring-like member 77 and more specifically by an upstanding arm portion 78 of said member 77. Said arm portion is upstanding from a base leg portion 79 secured to said base plate 13 by a screw 80. Extending transversely of said base leg portion 79 is a portion 80 passing under the mirror member 45 and then having an arm portion 82 angled upwardly to have its free end underlie said lever 59 to be engaged by said lever with each stroke of said lever when depressed by said actuating member 66.

Said member 77 will be formed of an electrically conductive material. Said collar 72 and said end cap 75 will also be formed of electrically conductive material. Carried between said collar 72 and said end cap 75 will be a pencil type of flashlight battery 76 placing said member 77 into circuit with said light bulb 70. When the lever 59 is depressed by said actuating member 66, it will engage the underlying adjacent portion 82 of said member 77 and the forward portion of said lever 59 will engage the overhanging arm portion of the plate member 43 to complete and open a circuit for illumination of the bulb 70.

Now, with reference to the pattern-forming member 50, said member may be variously rotatably mounted on the end wall 23. In the particular embodiment here disclosed, said front wall 52 of said member 50 is shown having a projecting cylindrical sleeve 52a providing communication with said chamber 54 and enclosing said sleeve in water-tight engagement is an end cap 52b which forms a journal disposed in a circular opening or aperture 23a in said end wall 23 with said aperture forming a bearing, as indicated in FIG. 4. It has been found that said member 50 is satisfactorily held in position by the pressure of the mirror member 45 thereagainst. The rotation of the member 50 is intermittent and the simple assembly indicated works out very nicely. Said journal 52b may extend through the end wall 23 as illustrated or said end wall may be formed to enclose said journal as may be desired.

Within said chamber 54 of said member 50 extending inwardly radially from the inner side of said peripheral surface 53 and being integral therewith and with the walls 51 and 52 are a plurality of vanes 56 shown here by way of example to be six in number and said vanes will be spaced equally apart. Said chamber 54 will be partially filled with a liquid 85, such as with water. Said liquid may be clear or colored as may be desired. Carried within said chamber are a multiplicity of vari-colored and vari-formed members of small size which are indicated generally by the character 86 and which preferably will be brightly colored. A portion of the said members 86 of which some are indicated by the character 87 will be constructed to float in said liquid and will tend to rise to the surface thereof, and other of said members of which some are indicated by the character 89 will be constructed to sink within said liquid and seek the bottom thereof.

A disk 90 is provided having a suitable pattern on its face and will be apertured to be disposed over the journal 52b to face the outer surface of the front wall 52 of said member 50. Said member may be readily formed of substantially rigid paper or suitable plastic material. The design may be as desired.

*Modification*

With reference to FIGS. 9 and 10, a modification is shown of applicant's pattern-forming member 50, with said modification being indicated generally by the character 95. The installation and mechanical operation of said member 95 will be identical with that of the member 50. The difference lies in the pattern-forming portion thereof.

Said member 95 comprises spaced walls 96 and 97 having a cylindrical side or peripheral wall 98 therebetween integral with said wall 97 and formed therein is a chamber 99. The width of said chamber 99 may be less than that of the chamber 54. Said wall 97 will have a toothed or ratchet flange 97a identical with that of the ratchet flange 52a. Extending outwardly of said wall 97 is a cylindrical hub portion 97b forming a journal to be disposed within the aperture 23a of said end wall 23. Said wall 96 has an annular flange portion of reduced thickness forming a shoulder 97c to be snapped into and snugly received within the peripheral wall 98 for frictional engagement therewith. Disposed within said chamber 99 are a number of disk-like members 100 of graduated diameter with the smallest being innermost facing the viewing end of the device 10. Each of said disk-like members preferably will have a different pattern on their respective faces as seen by the viewer and each of said patterns preferably will be non-uniform or variegated. Said disk-like members are disposed freely within said chamber 99 and will be supported on their edge portions.

*Operation*

Unlike the conventional type of kaleidoscope, applicant's device is not rotated by hand to change the pattern formed in the pattern-forming member thereof. Further, applicant's device provides a self-contained light source.

The operator will take the applicant's device in hand, place an eye to the viewing aperture 37, and depress with a finger the actuating member 66 which pivots the lever 59 raising the remote end thereof to engage the toothed flange 52a and rotate for a short distance the pattern-forming member 50. Thus as said actuating member 66 is alternately depressed and released, said pattern-forming member will have intermittent rotation and each period or step of rotation will cause a movement of the vari-colored and vari-formed member 86. It will be noted that as said member 50 is rotated, the vanes 56 will shift the positions of the members 86 by elevating the sunken or lower members 89 and moving downwardly the floating member 87. As the vanes respectively approach vertical positions, the members 87 and 89 respectively engaged by said vanes will move away from said vanes seeking their natural level in said liquid. In the process of seeking their natural levels, said members 86 inter-mingle as they pass one another and tend to bump and jar one another in passing. All of this comprises an irregular or non-uniform action which forms the patterns viewed. Due to the irregular character of the movement of said members 86 there is an endless variety of ever changing patterns.

Each time that the member 66 is depressed and the lever 59 actuated, an electrical circuit is opened as described above whereby the bulb 70 is energized to illumine the pattern-forming member whereby the operator or viewer watches the movement of the members 86 in forming patterns. The operator is viewing a moving scene which provides a source of endless fascination.

The disk member 90 provides a background for the member 86 in facing the outer surface of the wall 52 of the member 50 with a desirable pattern. This member is readily interchangeable with other like members.

With reference to the pattern-forming member 95, this member is actuated within applicant's device by the actuating member 66 in the same manner as the pattern-forming member 50. However, the pattern-forming portion thereof is of simpler construction comprising a plurality of disk-like members 100 with the respective members being arranged to have successively larger diameters in sequence in the direction away from the viewer. Thus as the member 95 is rotated, the disk-like members 100 respectively rotate at different rates of rotation in accordance with their respective diameters. Only the portions of each disk-like member are visible to the viewer which extends beyond the disk-like members thereinfront. With each disk-like member rotating at a different rate, the smaller of these members will rotate faster than the larger of these members. Each disk-like member will have a variegated pattern so that there is a constant change of appearance relationship between said members and thus an endless variety of patterns are formed.

With reference to the applicant's device as a whole, the cover 27 is readily removed from the base portion as is evident from the description. All portions of the device are thus readily accessible. The pattern-forming member is readily removable for exchange and the battery and light bulb are readily replaceable.

Thus the applicant has provided a simply constructed kaleidoscope utilizing an actuating member for changing the patterns formed therein and for energizing a light source to illumine said patterns.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:
1. A kaleidoscope device having in combination,
a pattern-forming member of relatively small width having a chamber therein,
a plurality of circular disk members of different diameters disposed within said chamber to stand on edge therein adjacent one another,
said disk members having varied patterns on their respective faces, said patterns facing the viewing end of said device,
said disk members arranged in sequence to respectively have successively larger diameters in a direction away from the viewing end of said device, and
means rotating said pattern-forming member.

2. A kaleidoscope device having in combination,
a housing member comprising a base portion and a removable cover portion,
a mirror member supported on said base portion,
said housing member having a viewing aperture,
a pattern-forming member rotatably carried within said housing member,
a lever disposed longitudinally of said housing,
means in said housing pivotally supporting said lever,
a plunger upstanding from adjacent one end portion of said lever,
said cover portion having a slot therein aligned with said plunger,
resilient means normally projecting said plunger through said slot and tilting said lever,
lighting means carried within said housing member,
a switch for said lighting means positioned to be engaged by said lever, and
means carried by said pattern-forming member for engagement by said lever for rotation of said pattern-forming member whereby manual reciprocation of said plunger rotates said pattern-forming member and engages said switch to energize said lighting means.

3. A kaleidoscope device having in combination,
a housing member comprising a base portion and a removable cover portion,
said housing member having a viewing aperture,
a pattern-forming member, means rotatably supporting said pattern-forming member within said housing member, a toothed peripheral flange about said pattern-forming member,
a mirror member extending between said viewing aperture and said pattern-forming member,
lighting means within said housing member,
a switch in connection with said lighting means,
a lever extending longitudinally within said housing member, means pivotally supporting said lever,
one end of said lever engaging said peripheral flange, and a portion adjacent the other end of said lever engaging said switch,
said cover portion having a slot therein,
a plunger upstanding from said lever and projecting through said slot, and
resilent means normally projecting said plunger through said slot and urging said lever to a position free of engagement with said switch.

4. A kaleidoscope device having in combination,
a housing member comprising a base portion, end walls and a removable cover portion,
one of said walls having a viewing aperture,
a pattern-forming member within said housing member, a toothed flange about said pattern-forming member,
said pattern-forming member being disposed adjacent the other of said end walls,
a projecting hub portion extending forwardly of said pattern-forming member forming a journal,
said last mentioned end wall comprising a bearing to receive said journal and rotatably support said pattern-forming member,
a mirror member extending between said end walls,
a lighting means within said housing member,
a switch in connection with said lighting means,
a lever extending longitudinally within said housing member, means pivotally supporting said lever,
one end of said lever engaging said peripheral flange, and a portion adjacent the other end of said lever engaging said switch, said cover portion having a slot therein,
a plunger upstanding from said lever and projecting through said slot, and
resilient means normally projecting said plunger through said slot and urging said lever to a position free of engagement with said switch.

5. The structure set forth in claim 4,
said pattern-forming member having spaced walls and a chamber therebetween,
said journal comprising a removable end cap for communication with said chamber,
a plurality of radial vanes within said chamber,
a liquid partially filling said chamber, and
a multiplicity of vari-colored and vari-formed members of relatively small size within said chamber, some of said members being particularly constructed and arranged to rise within said liquid and the remaining of said members being particularly constructed and arranged to sink within said liquid as said pattern-forming member is rotated and said members are moved about by said vanes within said chamber.

References Cited by the Examiner
UNITED STATES PATENTS

| | | | |
|---|---|---|---|
| 593,405 | 11/1897 | Reeves | 88—15 |
| 1,034,478 | 8/1912 | McComb | 88—15 |
| 1,454,691 | 5/1923 | Riddell et al. | 88—24 |
| 2,727,426 | 12/1955 | Lopez | 88—15 |
| 2,763,078 | 9/1956 | Graves. | |
| 2,954,723 | 10/1960 | Dunn | 88—150 X |
| 3,303,856 | 4/1962 | Jordan | 88—150 X |
| 3,039,356 | 6/1962 | Knittel | 88—15 |

FOREIGN PATENTS 8,909   1893   Great Britain.

JULIA E. COINER, *Primary Examiner.*